(12) United States Patent
Vilain (10) Patent No.: US 7,405,403 B2
(45) Date of Patent: Jul. 29, 2008

(54) BOLOMETRIC DETECTOR, DEVICE FOR DETECTING INFRARED RADIATION USING SUCH A DETECTOR AND METHOD FOR PRODUCING THIS DETECTOR

(75) Inventor: Michel Vilain, Saint Georges de Commiers (FR)

(73) Assignee: ULIS, Veurey Voroize (FR)

( * ) Notice: Subject to any disclaimer, the term of this patent is extended or adjusted under 35 U.S.C. 154(b) by 331 days.

(21) Appl. No.: 11/364,351

(22) Filed: Feb. 28, 2006

(65) Prior Publication Data

US 2006/0208189 A1      Sep. 21, 2006

(30) Foreign Application Priority Data

Mar. 16, 2005   (FR)   ................... 05 02580

(51) Int. Cl.
   *G01J 5/00*   (2006.01)
(52) U.S. Cl. .................................. 250/338.3
(58) Field of Classification Search ............... 250/338.3
   See application file for complete search history.

(56) References Cited

U.S. PATENT DOCUMENTS 5,367,167 A    11/1994   Keenan

| | | |
|---|---|---|
| 5,760,398 A | 6/1998 | Blackwell et al. |
| 5,912,464 A * | 6/1999 | Vilain et al. ............. 250/338.4 |
| 6,426,539 B1 | 7/2002 | Vilain et al. |

FOREIGN PATENT DOCUMENTS

| | | |
|---|---|---|
| EP | 0 828 145 A1 | 3/1998 |
| FR | 2796 148 A1 | 1/2001 |

* cited by examiner

*Primary Examiner*—Constantine Hannaher
*Assistant Examiner*—Marcus H Taningco
(74) *Attorney, Agent, or Firm*—Burr & Brown (57) ABSTRACT

A bolometric detector for electromagnetic radiation comprising a sensitive part or membrane comprising one or more layers of a sensitive material, the resistivity of which varies with temperature; first electric conductor elements in electrical continuity with a readout circuit associated with the bolometric detector and acting as electrodes for the detector and being in contact with the sensitive material and acting as an electromagnetic radiation absorber; second electric conductor elements at a floating potential acting only as an electromagnetic radiation absorber; at least one support area for the sensitive part fulfilling the function of positioning the sensitive part and electric conductor in relation to the readout circuit; at least one thermal isolation structure electrically and mechanically linking each support area to the sensitive part. The conductor elements are distributed as two crossed, superimposed networks of conductive tracks, the first of the two networks comprising all the first conductor elements.

17 Claims, 3 Drawing Sheets

BOLOMETRIC DETECTOR, DEVICE FOR DETECTING INFRARED RADIATION USING SUCH A DETECTOR AND METHOD FOR PRODUCING THIS DETECTOR

FIELD OF INVENTION

The present invention relates to a bolometric detector and to a device for detecting infrared radiation using such a detector. It also relates to a method for producing such a detector. The invention has applications in the field of infrared imaging in particular.

DESCRIPTION OF THE PRIOR ART

In the area of infrared detectors, devices configured in the form of an array and capable of operating at ambient temperature, i.e. not requiring cooling to extremely low temperatures, are known—in contrast to detecting devices called "quantum detectors" which can only operate at extremely low temperature, typically that of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector generally includes:
means of absorbing the infrared radiation and converting it into heat;
means of thermally isolating the detector so that its temperature can rise due to the effect of the infrared radiation;
thermometric means which, in the context of a bolometric detector, use a resistance element;
means of reading electrical signals provided by the thermometric means.

Detectors intended for infrared imaging are produced as a one- or two-dimensional array of elementary detectors on a substrate generally made of silicon which incorporates means of electrically exciting said elementary detectors and means of pre-processing the electrical signals generated by these elementary detectors.

These means of electrical excitation and pre-processing are formed on the substrate and constitute a readout circuit.

Monolithic integration of the detectors with the corresponding readout circuit is advantageous in terms of manufacturing costs. Nevertheless, it is also possible to hybridise an array of detectors produced on a second independent substrate on such a readout circuit.

A device comprising an array of elementary detectors and an associated readout circuit is generally placed in a package and connected, especially electrically, to its external environment using classic techniques (metal wires and pins). The pressure inside such a package is reduced in order to limit thermal losses. This package also has a window that is transparent to the radiation to be detected.

In order to observe a scene using this detector, the scene is projected through suitable optics onto the array of elementary detectors and clocked electrical stimuli are applied via the readout circuit (provided for this purpose) to each of the elementary detectors or to each row of such detectors in order to obtain an electrical signal that constitutes an image of the temperature reached by each elementary detector.

This signal is then processed to a greater or lesser extent by the readout circuit and then, if applicable, by an electronic device outside the package in order to generate a thermal image of the observed scene.

The performance of uncooled bolometric detectors depends essentially on:
mastering the fabrication and integration of the most high-performance bolometric materials into extremely light-weight structures consisting of bolometer microbridges thermally isolated from the readout circuit in order to exploit the latter to the fall in terms of the signal-to-noise ratio;
mastering the thermal response time constant for a variation in the temperature of the scene;
the spatial uniformity of each of the parameters for the lowest possible fabrication cost.

The prior state of the art describes various ways of arranging the different components of the elementary detectors.

A major distinction is made between detectors with coplanar electrodes and detectors with parallel electrodes (so-called "sandwich" structure).

The invention relates more especially to detectors with coplanar electrodes in which the electric current which passes through the structure during operation flows in the plane of the layer of bolometric material.

This type of detector is generally constructed in the form of a suspended membrane which comprises a thin (typically from 0.1 to 1 µm) layer of temperature-sensitive bolometric material, two electrodes that are coplanar in the sense that they are arranged on the same surface of the bolometric material and an "absorber". The term "absorber" denotes one or more layers or arrangements of layers, the function of which is to capture electromagnetic radiation in order to convert it into heat inside the structure. Additional features are intended to support the membrane and produce the highest possible thermal resistance between the membrane (which is meant to heat up due to the effect of the radiation) and the readout circuit.

Document EP-A-0,828,145 describes a bolometric detector comprising a readout circuit and one or more elementary detectors which themselves comprise a sensitive part that includes, in particular, a layer of bolometric material as well as two conducting electrodes and at least one element that supports this sensitive part and in which the electrodes are interdigitated. This elementary bolometric detector is shown schematically in FIGS. 1 and 2.

Figure 1:
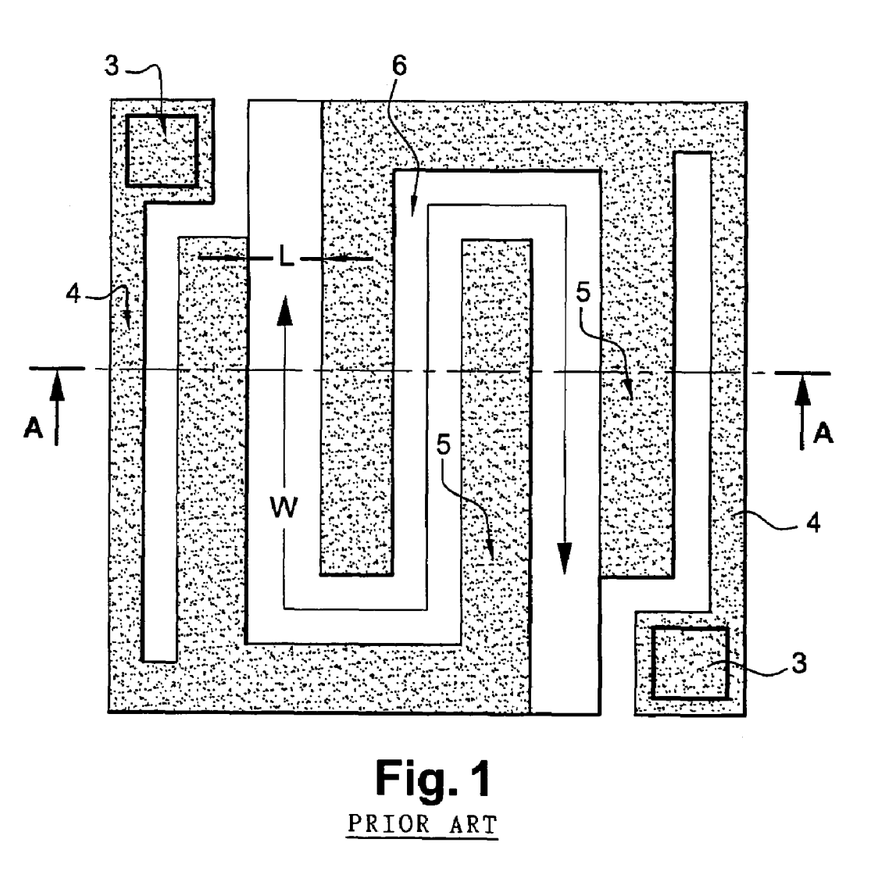
FIG. 1 is, as already stated, a plan view of an elementary bolometric detector according to the prior art
Figure 2:
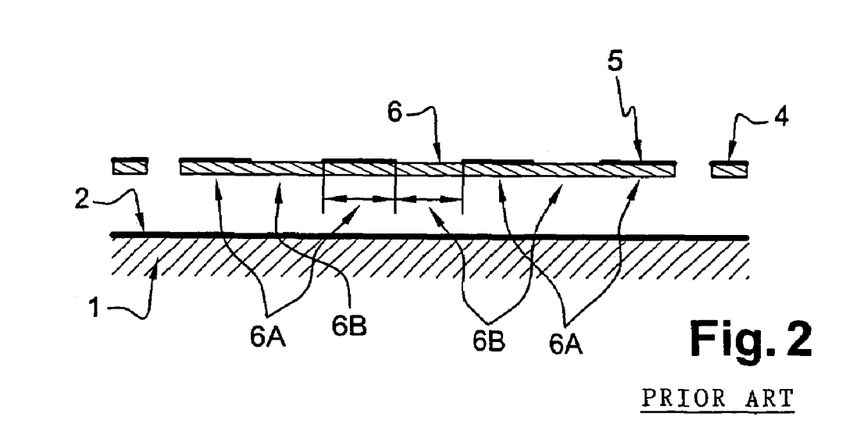
FIG. 2 is a cross-sectional view along line A-A.

In it, the readout circuit (1) is covered by a reflective metal layer (2) intended to reflect the infrared radiation that is not absorbed by the actual bolometer, the latter being located approximately 1.5 to 2.5 µm above said reflector (in order to optimise detection either side of the 10 µm wavelength that is substantially equivalent to the usual preferred sensitivity range of these detectors).

This positioning is obtained by means of substantially vertical structures (3). These structures, referred to as "posts" in the rest of this description, conduct electricity and thus make it possible to apply driving voltages to the conductive parts or electrodes (5) of the bolometric detector via flat, elongated structures (4) which also conduct electricity but are thermally resistive. These flat, elongated structures are referred to as "arms" in the rest of this description.

This thermal resistance, also referred to as "thermal isolation" is intended to allow the temperature of the bolometric material to rise due to the effect of the infrared radiation. The space between the body of the bolometer and the reflector is devoid of material apart from posts (3) in order to prevent thermal losses due to solid conduction. This space is usually filled with low-pressure gas in order to limit convection and thermal conduction by gases.

In this type of device, the readout circuit applies, via posts (3) and arms (4) and at least two conductive parts or electrodes (5), an electric current which flows through the structure parallel to the plane of the bolometric detector. This current flows through a bolometric material (6), the resistivity of which varies with temperature. The most widely used materials for this purpose are vanadium oxide and amorphous silicon.

The conductive parts or electrodes (5) are produced with the aid of a fine, usually metallic, conducting layer. They are also used to obtain absorption of the infrared radiation because of the way they are distributed over the available extension of the elementary detector referred to as a membrane. In FIG. 1 it can be seen that these electrodes are arranged on the upper surface of the bolometric material (6). However, said electrodes can also be arranged on the lower surface of the bolometric material or be inserted between two layers of said material.

The active part or membrane of the bolometer, i.e. the available extension of the elementary detector excluding the posts (3) and arms (4), is in the form of practically equipotential surfaces (5) that are in contact with the parts (6A) of the bolometric layer and resistive surfaces (6B) through which the driving current flows, the extension being defined by the spaces in between parts (5).

In the rest of this description, a distinction will be made between parts (6A) and (6B) of the layer of bolometric material (6) depending on whether or not the driving current flows through them (6B) or does not flow through them (6A).

The performance of a bolometric detector is traditionally expressed by its thermal resolution NedT (stands for Noise Equivalent Differential Temperature).

Document FR 2,796,148, for instance, demonstrates that, assuming that the bias level is sufficient for the electrical noise in the detector to be dominated by low-frequency noise (LFN), called "1/f" noise, which is characteristic, in particular, of amorphous materials, the thermal resolution is quantified by the equation:

$$\frac{1}{NedT} \approx k.(W.L.E)^{1/2}.TCR.Rth$$

where:
- k is a proportionality parameter which there is no point in detailing here which integrates the bandwidth of the readout circuit, the low-frequency noise level of the bolometric material (6) as "1/f", the surface area of the elementary detector and the infrared absorption effectiveness of the elementary detector;
- W and L are, respectively, the electrical width and length of the flows of current through the bolometric material (6) which can be seen in FIG. 1, the product W.L defining the area of the parts (6B) that are affected by the current flows;
- E is the thickness of the bolometric material (6) over the surface affected by the current flows bounded by the dimensions W and L;
- TCR is the relative coefficient of variation in resistance in the vicinity of the operating temperature (dR/RdT) which is characteristic of the bolometric material used where R is the electrical resistance across the two current supply terminals (the two posts (3)) and T is the temperature of the microbridge;
- Rth is the thermal resistance between the central "solid" part of the bolometer, the temperature of which rises due to the infrared radiation, and readout circuit (1), the temperature of which is constant or varies only very slowly.

By integrating the parameters TCR and Rth into constant k, this equation can be simplified as:

$$\frac{1}{NedT} \approx k'.(W.L.E)^{1/2}$$

Parts (6A) of the bolometric material play no part in defining the detection performance of the bolometric detector because practically no current passes through said bolometric material in this area, these areas being short-circuited by parts (5) which have a much lower electrical resistance.

In the case of a detection array, the repetition pitch of the elementary detector in both dimensions of the plane is defined as p.

In order to achieve optimum detection performance, according to the above analysis, it is sufficient to arrange parts (6B) in a polygon having an (electrical) length L and (electrical) width W, with $L.W=p^2$ in order to optimise detection performance.

This quantity $p^2$ represents the upper limit of the parameter L.W because, for technical reasons, one should set aside part of area $p^2$ to create clearance gaps between the elementary detectors and at least room for posts (3) and arms (4) and areas (6A), the surface area of which cannot be zero.

These quantities L and W are shown in FIG. 1 for a typical configuration.

It is apparent, however, that the effectiveness with which electromagnetic radiation is absorbed on such structures partially covered with a conducting layer, even one which is optimised in terms of surface resistance (or sheet resistance) drops rapidly if the relative area of the conducting surfaces (5) is reduced in favour of the relative area of highly resistive surfaces (6B). In practice, best performance in terms of bolometric resolution is obtained when there is a balance between areas (5) and (6B). As a result, roughly half the area of the membrane of the bolometer (parts (6A)) cannot be used to optimise the current flows which involves maximising the total area W.L. of the polygon(s) through which the current flows pass.

The conductive parts (5) in FIG. 1 represent the special case of an interdigitated layout. This type of layout is inevitable when using bolometric materials having a high resistivity such as amorphous silicon and similar materials in order to obtain a resistance R of several hundred to several thousand kilohms which is practical from the point of view of the readout circuit.

In fact, one of the difficulties encountered by those skilled in the art when defining bolometer structures is that of obtaining an electrical resistance R of an adequate value at around ambient temperature between the two conductive parts or electrodes (5) across which the driving voltage is applied.

Designing a bolometric detector shows that every resistance value is unsuitable for the readout circuit used by the designer of the product.

In order to optimise the functions of said readout circuit, it is, generally speaking, more practical to adapt the bolometer to the optimum operating ranges of the readout circuit, in terms of available voltage, rather than vice versa. In fact, it is crucial to obtain a sufficiently high electric current flow through the membrane during excitation in order for the performance of the detector not to be limited by an excessively low signal.

The drawback associated with the structure that uses interdigitated electrodes, as shown in FIG. 1, is the occurrence of areas where the current density exceeds the average density on the internal ends of conductive parts (5) as a result of the "point effect". These electric current concentrations result in an increased electrical noise level which is harmful to high detector performance.

Above-mentioned document EP-A-0,828,145 also proposes the use of materials having a low resistivity such as, typically, vanadium oxides as a bolometric materiel and recommends that the electrodes be distributed in straight, parallel, discontinuous strips leaving, for instance, all the internal strips unconnected, i.e. left at a floating potential, by connecting the two extreme strips to posts (3). In such an arrangement, current flows are then all parallel and uniform, thereby avoiding the additional electrical noise associated with point effects.

However, in this configuration, roughly half the surface of the membrane cannot be used to optimise current flows because optimising infrared absorption demands substantially uniform distribution of conductive parts (5) over the surface of the membrane.

Above-mentioned document FR-A-2,796,148 suggests a configuration intended to ease the constraint associated with the quality of absorption of radiation and of balance between the areas of the conductive parts or electrodes (5) and the areas (6B) of bolometric material.

As disclosed in this document, the parts (6A) where there is contact between electrodes (5) and the bolometric material (6) are reduced to small, narrow, elongated surfaces. Also, a substantial part of the surface of electrodes (5) is isolated from the bolometric material by interposing an isolating layer (7).

This technique makes it possible to use most of the available surface area on the membrane in order to optimise the polygon(s) of area W.L, thereby achieving substantially improved performance. However, this result is obtained at the expense of not insignificant additional fabrication complexity and also complicates the problem of excess noise that is inherent in the point effect if it proves necessary to use interdigitated electrodes. Such an interdigitated configuration is inevitable if one uses amorphous silicon or similar materials, because of the usually high resistivities of this type of material.

It is therefore apparent that, in both the above-mentioned documents according to the prior art, the absorber is produced by means of the same layer of material as the current supply electrodes, with all the advantages associated with this layout, but also the drawback described above of difficulty in obtaining an electrical resistance that is well-suited to the readout circuit.

In document U.S. Pat. No. 5,367,167, the absorber is made of a conductive layer that is separate and different to the current supply electrodes. This document describes a bolometric detector comprising two coplanar electrodes located on the same face of the layer of bolometric material as well as a conductive layer located on the other face of this layer of bolometric material. The function of this conductive layer is to absorb the infrared radiation that is to be detected and it must be separated from the body of the detector by an electrically insulating layer. Its implementation is, therefore, extremely complex.

In addition, the technology defined in this document naturally optimises current flows and therefore the low-frequency noise level since one is in a situation where the electrodes are placed far apart at two opposite edges of the elementary detector, on the other hand, this particular layout is only applicable to materials having a very low resistivity, typically vanadium oxides, otherwise the electrical resistance of the membrane is too high to obtain correct driving by the readout circuit and, in practice, it cannot be applied to amorphous silicon and similar materials.

SUMMARY OF THE INVENTION

The object of the present invention is to maximise the useful surface area of the bolometric material (maximise the product W.L) regardless of the resistivity of the bolometric material without the resulting performance of the detector being affected by excess noise associated, in particular, with point effects that are inherent to an interdigitated configuration of electrodes or conductive parts (5).

According to the invention, the bolometric detector comprises:

a sensitive part comprising:
  one or more layers of a sensitive material, the resistivity of which varies with temperature;
  first electric conductor elements in electrical continuity with the readout circuit associated with the bolometric detector and acting, on the one hand, as electrodes for said detector and, for this purpose, being in contact with said sensitive material and, on the other hand, acting as an infrared radiation absorber;
  second electric conductor elements at a floating potential acting only as an infrared radiation absorber;
at least one support area for the sensitive part fulfilling the function of positioning said sensitive part and electric conductor relative to said readout circuit;
at least one thermal isolation structure electrically and mechanically linking each support area to the sensitive part.

The bolometric detector according to the invention is distinctive in that the conductor elements are distributed as two crossed, superimposed networks of conductive tracks, the first of the two networks comprising all said first conductor elements and superimposition being total or partial.

The terms "crossed" and "superimposed" in the sense of the present invention should be construed as the fact that said conductive tracks of the first network converge with those that constitute the second network when they are projected respectively in the plane that contains the sensitive part.

Said first network also comprises second conductor elements; however, at least two of the conductive tracks that constitute it are in contact with the sensitive material that constitutes the sensitive part in order to form the electrodes. This contact occurs advantageously over their entire length, thereby optimising the performance of the detector.

In the various configurations of the invention that is possible to envisage, it is possible that there is no electrical contact between the two networks. However, if a sensitive material with a high resistivity is used, at least two of the tracks of the second network are in alternating contact with said special tracks of said first network that is in contact with the sensitive material that constitutes the sensitive part.

This being so, the inactive surface areas of the detector according to the invention are reduced significantly in favour of useful surface areas whilst at the same time diminishing the excess noise associated with constriction of current flows which varies depending on the detailed configuration of the conductor elements and the bolometric material used.

According to the invention, the respective tracks of each of the two networks are essentially straight and parallel to each other, the conductive tracks of the first network typically being at right angles to those that constitute the second network.

In addition, the spacing pitch between each of the tracks of one of the networks is identical or different to the spacing pitch between the tracks of the other network.

Contact between two tracks of two different networks is obtained by an opening in a dielectric layer interposed between the sensitive layer that constitutes the sensitive part and the first level of conductive tracks that constitute the first network.

BRIEF DESCRIPTION OF THE DRAWINGS

The way in which the invention is implemented and its resulting advantages will be made more readily understandable by the descriptions of the following embodiments, given merely by way of example, reference being made to the accompanying drawings.

DETAILED DESCRIPTION OF THE INVENTION

The invention therefore initially relates to an elementary bolometric detector and, more particularly, the configuration and layout of the conductive tracks on its sensitive part which itself constitutes the heart of the membrane. These conductive tracks function, as appropriate, as electrodes, i.e. they supply electric current from the readout circuit to the sensitive part, and as an absorber of the infrared radiation to be detected, or only function as an absorber.

Figure 3:
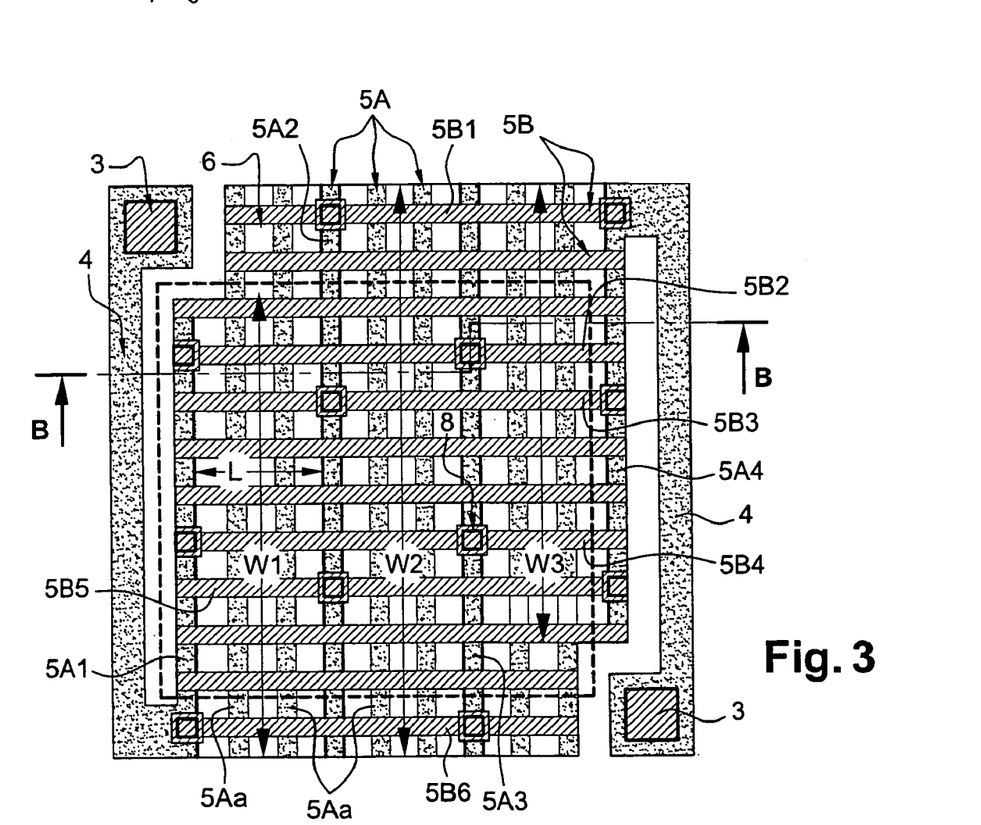
FIG. 3 is a schematic plan view of a detector according to the present invention and FIG. 4 is a cross-sectional view along line B-B.

FIG. 3 shows a typical embodiment of the bolometric membrane according to the invention. The various components that are also common to FIG. 1 have the same reference numeral.

According to a fundamental feature of the invention, said membrane accommodates two separate networks of conductive tracks (5).

The first network consists of a series of conductive tracks (5A) that are essentially straight and parallel to each other. In the example described, four of these tracks (5A1, 5A2, 5A3 and 5A4) are in contact with the bolometric material (6) that constitutes the membrane. In addition, this contact occurs essentially over the entire length of said tracks.

However, to enable operation of the detector in accordance with the invention, it is sufficient if only two of these tracks are actually in contact with said bolometric material. In fact and in order to optimise the area (W.L) mentioned earlier when dealing with the technical problem that the present invention aims to solve, extreme conductive tracks (5A1) and (5A4) are actually in contact with the bolometric material (6).

A different configuration would result in loss of the surface area located beyond said extreme conductive tracks, a result which would be precisely the opposite of that desired.

In the example described in relation to FIG. 3, it is apparent that network (5A) is only in contact with the bolometric material (6) for one track out of three, in particular a first track (5A1) and a last track (5A4) are in contact with layer (6) along two opposite edges.

The second network also consists of a series of conductive tracks (5B) that are essentially straight and parallel to each other as well as typically being oriented at right angles to the conductive tracks (5A) that constitute said first network. In FIG. 3 one can see that when projected in the plane that contains the membrane, the conductive tracks that make up each of the two networks are perpendicular to each other.

In the example described, three pairs of these conductive tracks, (5B1, 5B2), (5B3, 5B4) and (5B5, 5B6) respectively, are alternately in electrical contact with special tracks (5A1, 5A2, 5A3 and 5A4) of the first network, i.e. with the conductive tracks of the first network that are in contact with the bolometric material (6). Thus, in FIG. 3, the second network (5B) is only in contact with the special tracks (5A1, 5A2, 5A3 and 5A4) of said first network (5A) for one track out of two (on average).

This particular typical configuration makes it possible to obtain a resistance that is sufficiently low despite using a sensitive material (6) with a high resistivity. In fact, in this particular configuration, there is a sufficient number of electrical contacts with the tracks of network (5A), said contacts being spaced a regular distance L apart in order to achieve a uniform current density. These contacts are alternately set to high and low potential (during readout) with the aid of connections made by means of the tracks (at least two) of second network (5B).

This being so, one produces an interdigitated "comb", the resistance of which is proportional to L/(n−1), where n denotes the number of conductive tracks of network (5A) that are in contact with the sensitive material (6). Thus, with a spacing pitch p and simplifying matters drastically, one can have p/L conductive tracks (5A) in contact with sensitive material (6) with a resistance:

$$R \approx p/n(n-1)$$

Thus, conductive tracks (5A1) and (5A3) are each in electrical contact with conductive tracks (5B2, 5B4 and 5B6) whereas conductive tracks (5A2) and (5A4) are each in electrical contact with conductive tracks (5B1, 5B3 and 5B5). However, once again, to enable operation of the detector in accordance with the invention, it would be sufficient if only two of these tracks (5B) were actually in alternate contact with said special conductive tracks (5A1, 5A2, 5A3 and 5A4) of said first network.

This alternation makes it possible to prevent any short-circuit between the electrodes of the membrane.

All these special tracks, regardless whether they belong to the first or the second network therefore act as electrodes and absorbers. In contrast, all the other tracks are confined to fulfilling only the function of a radiation absorber.

In the particular configuration where only two conductive tracks of network (5A) are in contact with the sensitive material (6), a configuration which is adequate to produce a functional elementary bolometer, there is no need to produce contacts with the conductive tracks of network (5B) because the latter only act as radiation absorbers.

To a large extent and in contrast to the constraints imposed by detectors according to the prior art, the density (i.e. the spacing pitch) of the conductive tracks of each network is arbitrary and does not affect the performance of the detector. The possibility of having two independent crossed networks of conductive tracks having a relatively free spacing pitch obviously makes it possible to produce a larger number of layouts and combinations in order to define the geometry of the current flows in the bolometric material (6) and hence the overall resistance R of the detector.

Thanks to this flexibility with which the conductive tracks can be configured and distributed, it is apparent that those skilled in the art can easily achieve the desired overall resistance value R of the detector depending on the bolometric material (6) used by carefully varying the spacing between the conductive tracks (their pitch) and, in particular, the space between the conductive tracks of network (5A) that are in contact with said bolometric material and the distribution of connections between the two networks. It should be emphasised that achieving such a result makes it unnecessary to resort to having folded or interdigitated electrodes in contact with the bolometric material as recommended by the prior art, this being, the reader is reminded, the source of excess noise associated with point effects. Not only this, the embodiment of the invention makes it possible to exploit the majority of the useful surface area of the bolometric material (maximising the product W.L). This being so, the invention has the double advantage of highly flexible design and optimum performance.

From a practical point of view, forming a contact between the special conductive tracks (5A1, 5A2, 5A3 and 5A4) of the first network and the bolometric material (6) is typically obtained by means of substantially linear openings in a first interposed dielectric layer (7A) covering the layer of bolometric material (6) and allowing electrical isolation between the latter and the conductive tracks (5Aa) of said first network which act only as radiation absorbers.

However, one particular embodiment of the invention involves giving all the conductive tracks (5A) of said first network the dual function of electrode and infrared radiation absorber. In this case, all the conductive tracks (5A) of said first network are in contact with the layer of bolometric material (6). This being so, the layer (7A) of dielectric material is superfluous. In this configuration, not all said conductive tracks of network (5A) need to be connected to network (5B). In this case, those conductive tracks of network (5A) that are not connected to tracks of network (5B) act as electrodes at a floating potential.

Figure 5:
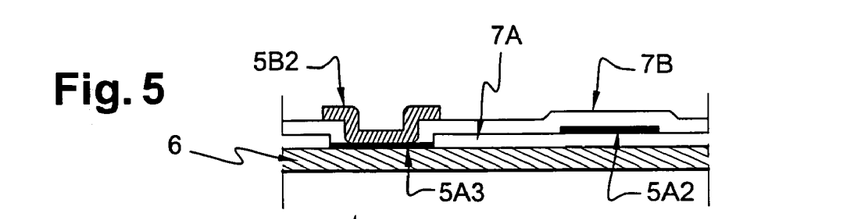
FIG. 5 is a detailed view of part of said cross-sectional view in FIG. 4.

Forming an electrical contact between the special conductive tracks (5A1, 5A2, 5A3 and 5A4) of the first network and certain conductive tracks of the second network, in accordance with the comments above, is typically obtained by means of substantially point-shaped openings (8) (the term "point-shaped" should be construed as "having extremely s small dimensions compared with those of the membrane") made in a second layer of dielectric material (7B) interposed between the conductive tracks that only act as absorbers (5Aa) of said first network and the conductive tracks (5B) of said second network (see FIG. 5). These openings (8) are located at certain particular intersection points of said conductive tracks in accordance with the preceding description.

FIG. 3 shows one of the possible special configurations according to the invention. This configuration makes it possible to obtain an overall resistance R that is roughly twice as high as that obtained using the configuration in FIG. 1, obviously using the same layer of bolometric material (6).

Other configurations of the two networks make it possible to preserve a comparable resistance R. The configuration proposed in FIG. 3 makes it possible to explain all the advantageous features of the invention simply, without the need to explain other configurations that are well within the ability of those skilled in the art, once the general underlying principle of the invention has been understood.

The layout of the points of contact (8) between the two networks of conductive tracks explains the alternating-contact principle mentioned earlier in order to generate regularly alternating equipotentials among the conductive tracks of network (5A). It would, however, also be possible to establish contact between the tracks of said network (5A) and all the tracks of network (5B) and it would also be possible to make contact between them and only one track of network (5B) for each equipotential group if this were to produce an acceptable input resistance R. In fact, the density of the contacts between the two conductive networks (5A) and (5B) is dictated primarily by the possibly excessively high input resistance which an excessively low contact density would cause.

An incidental advantage of the recommended configuration of the present invention should also be emphasised. Using two networks that are interconnected only by point-shaped contacts and, in particular, the fact that the contacts are distributed over at least two tracks (5B) between the two networks, achieves connection redundancy which substantially improves the probability of distributing potentials correctly and avoids the hazardous effect of a single, possibly misformed, contact between two tracks.

The very special case where only the extreme lines (5A1) and (5A4) of network (5A) are in contact with the layer of bolometric material (6) needs to be considered. In this case there is no need to form electrical contacts (8) between the two networks (5A) and (5B) since such contacts would cause a short-circuit in the structure. The resulting resistance in this particular configuration would assume its maximum possible value in the direction in question of the membrane at right angles to network (5A) due to the disappearance of alternating potentials, but the structure would nevertheless still be optimised in terms of low-frequency noise level and optical absorption.

It should also be noted that other internal tracks (between these extreme tracks) of network (5A) may also be in contact with the layer of bolometric material (6) without substantially modifying the structure of the current flows and hence the functionality or quality of the detector apart from the surface area occupied by additional contacts to said layer (6). As already stated, assuming that all the tracks of network (5A) are in contact with layer (6), it is obviously convenient to preferentially eliminate layer (7A) which is then pointless.

The configuration recommended by the invention makes it possible to simplify the implementation of such a detector substantially. It makes it possible, for instance, to extend the extreme tracks (5A1) and (5A4) of network (5A) continuously onto arms (4) towards conductive posts (3).

In addition, the invention makes it possible to preserve bolometric material (6) in the vicinity of arms (4), thereby also simplifying the process of producing such a detector. Admittedly, generally speaking one avoids preserving said material in this area in order to improve the thermal resistance of the detector, but this is not the object of the invention.

Other methods of supplying electric current to the "terminals" of the sensitive membrane can be imagined without extending beyond the scope of the invention. Another particular embodiment can be obtained, for example, by extending network (5B) rather than (5A) onto posts (3). The choice of a particular conductive layer selected for this purpose is dictated firstly by the electrical and thermal conduction properties of the material used for each of the networks, which may be different, and secondly by the convenience of the technology which can be used to assemble the structure.

It should in fact be noted that, according to the invention, the number of conductive tracks and the geometrical characteristics (width, thickness, detailed shape) of the two conductive networks are in no way confined to those of the example described which is intended for demonstration purposes only.

Figure 6:
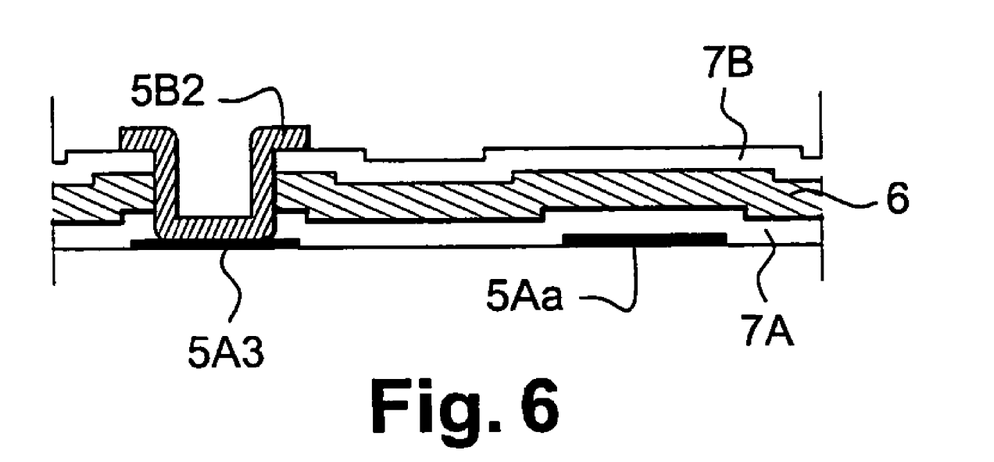
FIGS. 6 and 7 are also detailed views, but of other embodiments of the invention.

Other network configurations within the scope of the invention can also be envisaged. It is possible to place network (5A) underneath the layer of bolometric material (6). In this case the optional dielectric layer (7A) is placed between said network and layer (6). This dielectric layer (7A) is removed opposite the tracks of network (5A) which the designer intends to come into contact with the bolometric material (6). The points of contact between the two networks (5A) and (5B) are obtained by making through-openings in the layer of said material (6) and the dielectric layer (7B) that covers the upper surface of said layer of bolometric material (6). Network (5B) is then formed on top of this assembly. It is, however, possible to reverse the roles of networks (5A) and (5B), i.e. to make linear contacts with the bolometric material (6) with the aid of the upper network. This configuration is shown in FIG. 6.

Figure 7:
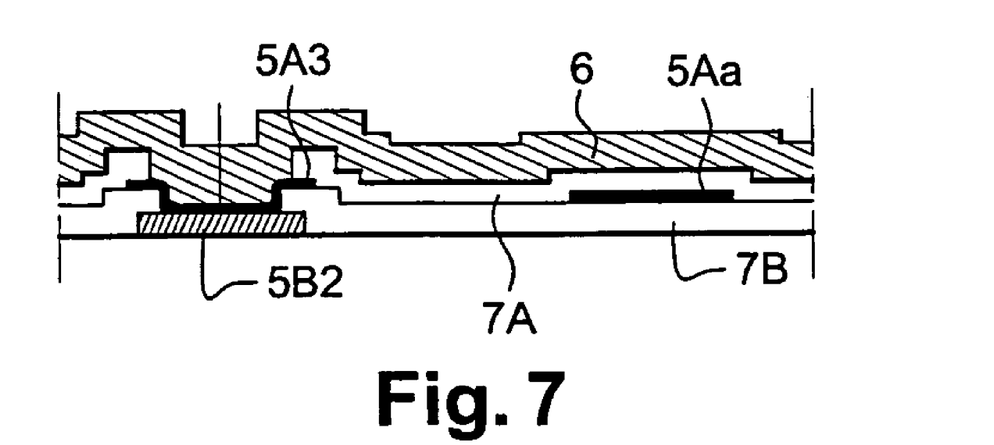

It is also possible to turn the structure described in FIG. 3 the other way round completely by placing the two networks (5A) and (5B) underneath the layer of bolometric material (6) as shown in FIG. 7. This particular configuration is advantageous if, for fabrication process reasons, one wishes to deposit the sensitive material (6) as late as possible in the assembly process. Such a need may, in particular, be the result of problems of incompatibility of the sensitive material with the processes for defining other materials or problems in obtaining direct access to the entire surface of the sensitive material once the device has been completed.

Nevertheless, all these variants rely on the same operating principle of the invention.

The criteria for obtaining functional optimisation of detectors produced in accordance with the invention are stated below.

We shall consider the typical, but not limiting, situation where the membrane of the microbolometer is uniformly covered as far as its boundaries or edges by two orthogonal networks (5A) and (5B), each consisting of parallel, regularly spaced conductive tracks having identical linear resistance in each network. This configuration results in optimum absorption effectiveness. Absorption of incident electromagnetic radiation is optimised if the overall electrical resistance R between two opposite edges of the membrane is approximately 380 ohms. This value is for a membrane suspended 1.5 µm to 3 µm above a reflector and is well known to those skilled in the art in order to produce an electromagnetic absorber using a continuous conductive layer. Each of the networks (5A) and (5B) must be such that this criterion is met, at least approximately.

This data is valid for a membrane having a square external shape. Any other membrane shape can, nevertheless, be optimised if every outline sufficiently large to contain at least two track segments of each of the networks (5A, 5B) bounded by the membrane itself meets this criterion. Such an outline is shown by a dotted contour in FIG. 3.

Another way of assessing optimisation of the detector is to draw a "circumscribed" square by locally spreading the boundaries of the membrane (with concomitant extension of the networks) until one obtains a square which meets the criteria stated above.

For example a square membrane can be covered by a network of 10 parallel conductive tracks, each having a resistance of 3,800 ohms in one direction and a network of five parallel conductive tracks each having a resistance of 1,900 ohms in a direction at right angles to the latter. The resistance "seen" between two opposite edges equals 1/n times the resistance of a single conductive track that is at right angles to these edges for n parallel conductive tracks.

This criterion is a non-critical optimum because, in practice, a square membrane, the resistance of which between two opposite edges is of the order of 300 or 500 ohms in each direction, would only be marginally less effective. Those skilled in the art are aware that, in fact, absorption only varies slowly as a function of resistance in the vicinity of the above-mentioned optimum value.

In order to optimise the detector according to the invention, this general criterion is advantageously supplemented by a special criterion based on the pitch of each of the networks (5A) and (5B). The pitch must preferably not exceed half the wavelength of the average radiation that is to be detected. For a detector intended to detect radiation from 8 to 14 µm, one should advantageously use a pitch of less than 6 µm for each network of conductive tracks. Higher pitch values in particular result in diffraction phenomena that can have an adverse effect on the quality of electromagnetic absorption.

By satisfying these criteria, one can typically achieve absorption in excess of 90% of the incident radiation in the specified detection spectrum.

An embodiment of the detector in accordance with the invention is described below.

The retina arrays of microbolometers are usually obtained using traditional methods familiar to those skilled in the art by successive deposition and etching of the various layers that constitute the finished product: dielectric layer, bolometric material layer, metallic layer for equipotential areas (such as current supply and electrodes).

These various layers are deposited on the upper surface of a structural layer referred to as the "sacrificial" layer because it is eliminated at the end of the process in order to leave the structure of the bolometer and, more especially, the membrane suspended only by its thermal isolation features (in particular arms (4)).

An imaging retina is obtained by juxtaposing unitary membranes in an array as shown in FIG. 1 or 3; microelectronics techniques lend themselves naturally to this type of construction and to producing a large number of retinas on a single substrate simultaneously.

The following stages relate, more specifically, to producing the detection device according to the invention. This description applies in relation to a particular assembly. As such, under no circumstances does this description imply any limitation of the actual scope of the invention, especially in terms of structural variations which those skilled in the art can easily imagine, such as, for instance, those suggested in the foregoing explanations relating to the actual detector itself. Any reversal of the sequence of the layers, any detailed arrangement of the various parts or special production process falls within the scope of the invention.

The operations described below relate directly to producing a detector in accordance with FIG. 3.

The first stage involves depositing a "sacrificial" layer on the surface of the substrate (usually made of silicon) comprising the readout circuit. This sacrificial layer may typically consist of polyimide or any organic or mineral material able to withstand subsequent operating conditions of the manufacturing process and capable of being selectively eliminated once fabrication has been completed.

Advantageously in a well-known arrangement, a reflective metallic layer (2) (made of aluminium for example) is first deposited on the surface of substrate (1) and locally etched using known appropriate techniques in order to optimise the spectral behaviour of the detector. In this case the thickness of the sacrificial layer is set to 1.5 to 3 µm if the aim is to optimise absorption of radiation in the wavelength spectrum from 8 to 14 µm.

A layer of bolometric material (6) is then deposited on the surface of the sacrificial layer to a thickness of typically 50 to 500 nanometres using conventional techniques. The structure described here is especially suitable for amorphous silicon or similar materials of the $Si_xGe_yC_{(1-x-y)}$ type.

A first layer of dielectric material (7A), typically silicon oxide or nitride, typically having a thickness of 10 to 50 nanometres is then deposited on the surface of the layer of bolometric material (6), for example using Plasma Enhanced Chemical Vapour Deposition (PECVD).

This layer of dielectric material (7A) is etched by using a traditional lithographic mask and appropriate etching process, for example in accordance with the pattern in FIG. 3, i.e. very narrow parallel tracks. However, the width of these etched tracks is typically not less than the thickness of material (6) and, for instance, extends to a width of 0.2 to 2 μm. The spacing between these etched tracks is, for example, 5 to 50 μm.

The first layer of electrically conductive material (5A) is then deposited using known techniques appropriate to this type of layer. Any type of metal, preferably one that is customarily used in microelectronics, can be used, e.g. aluminium, titanium or titanium nitride. The first network (5A) of conductive tracks is defined by traditional etching using a second lithographic mask. Some of the tracks that form network (5A) are arranged opposite the openings made in the previously produced layer of underlying dielectric material (7A). The other tracks are left "floating", i.e. isolated from the bolometric material (6) by the dielectric layer (7A).

The thickness e and the resistivity (Rho) of layer (5A), i.e. the sheet resistance defined by Rho/e (expressed in quantities that are customarily used by those skilled in the art) are selected depending on the final dimensions of the conductive tracks of network (5A) in order to meet the general criterion stated earlier. For example, the portion of the membrane bounded by the dotted-line square comprises nine conductive tracks, each of which must have a resistance of approximately 3,400 ohms between the points where the tracks intersect the "horizontal" edges of the square drawn in a dotted line in FIG. 3. If one takes the nine parallel tracks, this gives roughly 380 ohms between the two opposite "horizontal" edges of said dotted-line square.

If the conductive layer (5A) has a sheet resistance of 100 ohms/square, obtained, for instance, with 10 nanometres of titanium nitride with a resistivity of 100 micro-ohms.cm, the length (inside the dotted-line square) to width ratio must be roughly 34. Assuming that FIG. 3 shows a bolometer having an overall edge size of 50 μm, the enclosed dotted-line square would have an approximate edge size of 34 μm and the width of tracks (5A) must therefore be roughly 1 μm, said tracks (5A) being repeated with a preferably regular spacing pitch of approximately 3.8 μm in order to fit the nine tracks and nine spaces that separate said tracks inside the dotted-line square.

Obviously, other combinations of parameters in terms of sheet resistance, track width and density are capable of producing a result that meets the above-mentioned general criterion.

As already indicated, it is possible to make provision for a configuration in which all the conductive tracks of the first network (5A) are in contact with the bolometric material (6). This special case is advantageous in the sense that it is then no longer necessary to use the layer of dielectric material (7A) and it eliminates the associated definition techniques (lithography and etching). It results in a significant decrease in complexity.

However, the total surface area of tracks (5A) that is in contact with layer (6) must be regarded as wasted in terms of optimising the device because the surface area of these tracks (5A) is equivalent to the surface areas (6A) in FIG. 3. It is therefore advantageous to limit the proportion of tracks that are in contact with bolometric material (6) to the bare minimum required in order to obtain the desired overall resistance for the entire membrane once assembly has been completed.

Similarly, the width of the contact areas, in this case the openings made in dielectric layer (7A), is limited to a minimum value that is practical for the same reason.

Layer (5A) is left intact opposite supporting conductive structures (4) (on the left and right in FIG. 3).

The conductive supports or posts (3) are then formed by applying a new lithographic mask intended to protect the entire structure apart from small-sized openings, e.g. openings having a side dimension of one to several μm. These openings are then etched through the superficial layers in the following order: conductive material (5A), dielectric material (7A), bolometric materiel (6) and then through the sacrificial layer as far as the surface of the contacts previously made on the surface of the readout circuit (1). A relatively thick layer is then deposited, e.g. a layer comprising, merely by way of example, 0.2 to 2 μm of a metal selected from materials that are traditional for this purpose, such as aluminium and alloys, titanium, titanium nitride, tungsten or tungsten silicide or a combination of these various materials.

A lithographic mask is then applied in order to preserve this metal in the immediate vicinity of the openings previously made and the metal(s) previously deposited using classic processes is/are eliminated from the rest of the surface by etching. Etching is stopped selectively as soon as layer (5A) is revealed. It may be advantageous to reverse the sequence of the last two lithographic masks and associated etching operations.

A second layer of a dielectric material (7B) of a type and thickness typically identical to first layer (7A) is deposited, then etched using a new lithographic mask retaining the localised openings (8) which open out onto the conductive tracks (5A1, 5A2, 5A3, 5A4) of network (5A) that are in contact with bolometric material (6).

A second electrically conductive layer (5B) is then deposited and defined as a network substantially at right angles to first network (5A) by using an appropriate lithographic level.

The same materials as those used for the first network can be used. Once again, the thickness and resistivity of this layer (5B) and hence its "sheet resistance" are selected depending on the final dimensions of the conductive tracks of this second network so as to meet the above-mentioned general criterion. For example, the portion of the membrane bounded by the dotted-line square, assumed to have an edge dimension of 34 μm, also comprises nine conductive tracks (5B) in this particular construction case, each of which must have a resistance of approximately 3,400 ohms between the points defined by the two "vertical" edges of the dotted-line square. If one wishes to define the width of each track as approximately 2 μm (and hence the spacing as 1.8 μm), for this second network (5B) one must use a layer of metal of 200 ohms/square, obtained, for instance, with 10 nanometres of titanium nitride having a resistivity of around 200 micro-ohms.cm. The nine parallel tracks are then equivalent to roughly 380 ohms between the two "vertical" edges of the dotted-lined square and this satisfies the optimisation criterion mentioned above.

A final lithographic level is used to cut out the periphery of the membrane as well as support structures (4) and posts (3) by non-selective etching of all the materials that constitute the membrane: (5B), if applicable (7B), (5A), (7A), (6) until the surface of the sacrificial layer is penetrated. The, preferably dry, etching techniques that are the most appropriate to this operation for all the materials mentioned are well-known to those skilled in the art.

The sacrificial layer is then eliminated by combustion in oxygen plasma, for example, in the usual case where said sacrificial layer is of an organic type and the membrane is suspended above substrate (1) in its final functional, optimised state.

Figure 4:
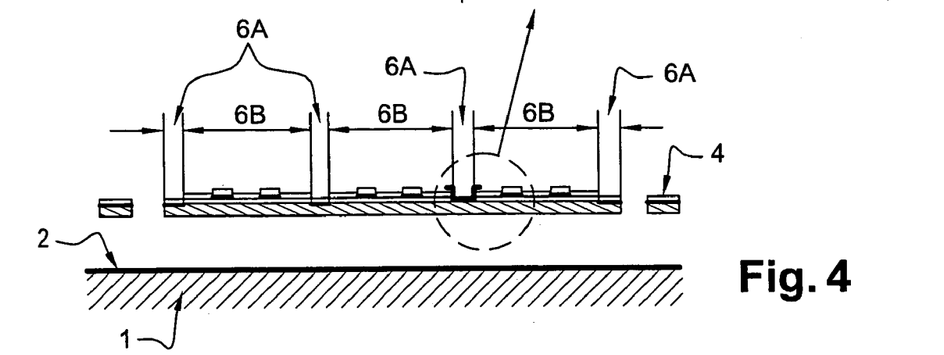

It is apparent, if one compares the configurations shown in FIGS. 1 and 3 and, more particularly, in the corresponding cross-sectional views (FIGS. 2 and 4) and especially with regard to the relative geometry of surfaces (6A) and (6B) (of which only the shorter side is indicated), that inactive surface areas, in the sense of current flows (6A), are considerably reduced in favour of useful surface areas (6B) thanks to use of the invention.

Comparative assessment of characteristic quantities W and L indicated in FIGS. 1 and 3 shows that the typical configuration proposed according to the invention improves distance L by a factor of roughly 2 and distance W by approximately 10%. In fact, the electrical width W in the example in FIG. 3 substantially equals the total $W_1+W_2+W_3$. The resulting relative improvement in performance in terms of signal-to-noise ratio is therefore approximately 50% or, alternatively, thermal resolution is reduced (improved) by 33%, a figure which is highly significant in this field.

To this gain, one can also add disappearance of the excess noise associated with current flow constriction which varies depending on the detailed configuration and the bolometric material used. It is reasonable to expect an extra 10 to 15% improvement in the signal-to-noise ratio, i.e. an approximate 40% reduction in thermal resolution compared with the technique described in Document EP-A-0,828,145.

The performance benefit provided by the invention as a result of allowing additional extreme flexibility in defining the electrical resistance of the membrane in order to adjust it to the functional requirements of the readout circuit, substantially without any compromise with regard to final performance, is clear. This feature is typically absent in the previous techniques disclosed in the documents cited in the preamble.

The invention claimed is:

1. A bolometric detector for electromagnetic radiation comprising:
    a sensitive part or membrane comprising:
        one or more layers of a sensitive material, the resistivity of which varies with temperature;
        first electric conductor elements in electrical continuity with readout circuit associated with the bolometric detector and acting, on the one hand, as electrodes for said detector and, for this purpose, being in contact with said sensitive material and, on the other hand, acting as an electromagnetic radiation absorber;
        second electric conductor elements at a floating potential acting only as an electromagnetic radiation absorber;
    at least one support area for the sensitive part fulfilling the function of positioning said sensitive part and electric conductor in relation to said readout circuit;
    at least one thermal isolation structure electrically and mechanically linking each support area to the sensitive part;
characterised in that the conductor elements are distributed as two crossed, superimposed networks of conductive tracks, the first of the two networks comprising all said first conductor elements.

2. A bolometric detector for electromagnetic radiation as claimed in claim 1, characterised in that networks and are wholly or partly superimposed.

3. A bolometric detector for electromagnetic radiation as claimed in claim 1, characterised in that said first network also comprises second conductor elements, but at least two of the conductive tracks that constitute it are in contact with the sensitive material that constitutes the sensitive part substantially over their entire length.

4. A bolometric detector for electromagnetic radiation as claimed in claim 3, characterised in that at least two of the conductive tracks of the second network are in alternate contact with said special tracks of said first network that is in contact with the sensitive material that constitutes the sensitive part.

5. A bolometric detector for electromagnetic radiation as claimed in claim 1, characterised in that the respective conductive tracks of each of the two networks are straight and parallel to each other and in that conductive tracks of the first network are at right angles to those that constitute the second network.

6. A bolometric detector for electromagnetic radiation as claimed in claim 1, characterised in that the two networks and of conductive tracks are positioned above the upper surface of the layer of sensitive material.

7. A bolometric detector for electromagnetic radiation as claimed in claim 6, characterised:
    in that the first network is electrically isolated from the layer of sensitive material by means of a first layer made of a dielectric material locally having openings opposite areas of contact between the special conductive tracks of said first network and the layer of sensitive material;
    in that a second layer of dielectric material is interposed between the conductive tracks that act only as absorbers of said first network and the conductive tracks of said second network;
    and in that contact between the special tracks of first network and certain conductive tracks of the second network is obtained at openings made in the second layer of dielectric material.

8. A bolometric detector for electromagnetic radiation as claimed in claim 1, characterised in that one of said networks is positioned underneath the layer of sensitive material and in that the other network is positioned above the layer of sensitive material.

9. A bolometric detector for electromagnetic radiation as claimed in claim 8, characterised:
    in that the first network is positioned underneath the layer of sensitive material and is electrically isolated from the latter by means of a first layer made of a dielectric material locally having openings opposite areas of contact between the special conductive tracks of said first network and the layer of sensitive material;
    in that the second network is positioned above the layer of sensitive material and is electrically isolated from the latter by means of a second layer made of a dielectric material;
    and in that the points of electrical contact between the two networks and are obtained by making through-openings in the layer of said material and the second layer of dielectric material.

10. A bolometric detector for electromagnetic radiation as claimed in claim 8, characterised:
    in that the first network is positioned above the layer of sensitive material and is electrically isolated from the latter by means of a first layer made of a dielectric material locally having openings opposite areas of contact between the special tracks of said first network and the layer of sensitive material;

in that the second network is positioned underneath the layer of sensitive material and is electrically isolated from the latter by means of a second layer made of a dielectric material;

and in that the points of electrical contact between the two networks and are obtained by making through-openings in the layer of said material and the second layer of dielectric material.

11. A bolometric detector for electromagnetic radiation as claimed in claim 6, characterised in that all the conductive tracks of said first network are in contact with the layer of bolometric material.

12. A bolometric detector for electromagnetic radiation as claimed in claim 8, characterised in that all the conductive tracks of said first network are in contact with the layer of bolometric material.

13. A bolometric detector for electromagnetic radiation as claimed in claim 12, characterised:

in that said network is positioned above the layer of sensitive material;

in that a layer of dielectric material is interposed between the conductive tracks of said first network and the conductive tracks of said second network;

and in that contact between the conductive tracks of the first network and certain conductive tracks of the second network is obtained at openings made in said dielectric layer.

14. A bolometric detector for electromagnetic radiation as claimed in claim 12, characterised:

in that said network is positioned underneath the layer of sensitive material;

in that the second network is positioned above the layer of sensitive material and is electrically isolated from the latter by means of a layer made of a dielectric material;

and in that the points of electrical contact between the two networks and are obtained by making through-openings in the layer of said material and the layer of dielectric material.

15. A bolometric type infrared detection device, characterised in that it uses one or more bolometric detectors as claimed in claim 1 and in that the detector(s) is/are joined to readout circuit by means of a post-type structure.

16. A bolometric type infrared detection device as claimed in claim 15, characterised in that it has an array structure comprising at least two bolometric detectors.

17. A method for producing a bolometric type infrared detector involving, starting with a readout circuit, particularly one produced on a silicon substrate:

firstly forming a first auxiliary sacrificial layer on said silicon substrate intended to be removed by any known means after producing the detector in order to thermally isolate the readout circuit from the detection module or sensitive part;

forming a layer of sensitive bolometric material on this auxiliary sacrificial layer;

depositing a layer made of a dielectric material on this sensitive layer;

using a lithographic mask and etching to produce linear openings of limited thickness in this layer in order to create areas of contact with the layer of sensitive material;

depositing a first layer of electrically conductive material;

using a lithographic mask to produce a first network of conductive tracks, some of which are situated opposite the openings made in the layer of dielectric material and because of this are in electrical contact with the sensitive material;

producing conductive supports or posts by applying a new lithographic mask intended to protect the entire structure apart from small-sized openings, said openings being etched through the superficial layers in the following order: conductive material, dielectric material, bolometric material, then through the sacrificial layer as far as the surface of contacts previously made on the surface of the readout circuit, then by depositing at least one metallic layer, then by etching this/these metallic layer(s) with the aid of a lithographic mask away from posts;

depositing a second layer of dielectric material on network;

using a lithographic mask and etching to produce openings in said dielectric layer localised on the conductive tracks of network that are in contact with the sensitive material;

depositing a second layer of electrically conductive material on the layer of dielectric material;

using a lithographic mask to produce a second network of conductive tracks substantially oriented at right angles relative to the tracks that constitute the first network;

using a lithographic mask and etching to define support arms and the peripheral contour of the membrane or sensitive part of the detector;

and finally, eliminating the sacrificial layer so that the membrane or sensitive part is suspended above the substrate.

* * * * *